(12) United States Patent
Chandrasekaran et al.

(10) Patent No.: US 8,743,694 B2
(45) Date of Patent: Jun. 3, 2014

(54) DETERMINATION OF BYPASS ZONES FROM NETWORK CONFIGURATION SETTINGS

(75) Inventors: Subramanian Chandrasekaran, Redmond, WA (US); Kenneth Araujo, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 579 days.

(21) Appl. No.: 12/870,857

(22) Filed: Aug. 30, 2010

(65) Prior Publication Data

US 2012/0051261 A1 Mar. 1, 2012

(51) Int. Cl.
*H04J 3/14* (2006.01)

(52) U.S. Cl.
USPC .......................................... 370/236; 370/254

(58) Field of Classification Search
None
See application file for complete search history.

(56) References Cited

U.S. PATENT DOCUMENTS

| | | | |
|---|---|---|---|
| 6,006,275 A | 12/1999 | Picazo, Jr. et al. | |
| 7,215,643 B2 * | 5/2007 | Mussman et al. | 370/237 |
| 7,706,802 B2 | 4/2010 | Xu et al. | |
| 2008/0311903 A1 * | 12/2008 | Levin | 455/426.1 |
| 2009/0129405 A1 | 5/2009 | Lauwers et al. | |
| 2009/0296687 A1 | 12/2009 | Ramanathan et al. | |

OTHER PUBLICATIONS

Spiegel, et. al., "An Alternate Path Routing Scheme Supporting QOS", Retrieved at <<http://ieeexplore.ieee.org/stamp/stamp.jsp?tp=&arnumber=512852>> Nov. 28-Dec. 2, 1994, vol. 2, pp. 1124-1230.

"Cisco Hosted / Manages Unified Communications Services", Retrieved at <<https://www.cisco.com/web/strategy/docs/gov/HUCS_SRND_1_6_0.pdf>> Retrieved Date: Jun. 11, 2010, pp. 1-148.

* cited by examiner

*Primary Examiner* — Andrew Lai
*Assistant Examiner* — Leon Andrews
(74) *Attorney, Agent, or Firm* — Sonia Cooper; Jim Ross; Micky Minhas

(57) ABSTRACT

Bypass zones for a network are identified by generating bypass identifiers that identify the bypass zones from network configuration settings. During call setup the bypass identifier assigned to an endpoint for the call is identified and the bypass identifier assigned to a gateway for the call is identified. A determination is then made as to whether the bypass identifier assigned to the gateway is the same as the bypass identifier assigned to the endpoint. If the bypass identifiers are the same, then a mediation server may be bypassed for the call. If the bypass identifiers are not the same, then the mediation server remains in the media path for the call.

10 Claims, 8 Drawing Sheets

DETERMINATION OF BYPASS ZONES FROM NETWORK CONFIGURATION SETTINGS

BACKGROUND

Large organizations may operate many different physical locations around a city, state, country, or even around the world. In order to provide real-time data and voice connectivity between locations, a number of wide area network ("WAN") links may be established. The WAN links can be utilized to support data communications between the locations, including audio and/or audio/video sessions made between client devices placed at the locations. For instance, voice over Internet protocol ("VoIP") calls may be made between clients placed at various locations connected by one or more WAN links. Similarly, video calls might also be made between clients placed at locations connected by WAN links.

In some real-time communications installations, a mediation server is utilized to mediate signaling and to translate media to and from other types of networks such as a public switched telephone network ("PSTN") or a cellular network. For instance, a mediation server may interface with a PSTN gateway to provide private branch exchange ("PBX") interoperability. The mediation server may provide signaling and media translation functionality to allow calls to be placed on and received from the PSTN.

Because a mediation server can add latency and increase the possibility of data packet loss, some real-time communications installations utilize a media bypass feature. The media bypass feature allows a mediation server to be removed from the media path ("bypassed") under certain conditions. By removing the mediation server from the media path, the latency added by the mediation server can be avoided, packet loss can be reduced, and in some network configurations a costly round-trip to the mediation server can be avoided. It can be difficult, however, to determine when it is appropriate to bypass the mediation server.

It is with respect to these and other considerations that the disclosure made herein is presented.

SUMMARY

Technologies are described herein for determination of bypass zones from network configuration settings. Through the utilization of the technologies and concepts presented herein, bypass zones can be determined in an automated fashion based upon the topology of a network as defined by network configuration settings. The bypass zones may then be utilized during call setup to determine if a mediation server can be bypassed.

According to one aspect presented herein, network configuration settings are stored that define the topology of a data network, such as a data network utilized for VoIP audio and video calls. For instance, the network configuration settings might identify network regions, sites associated with the network regions, subnets of the sites, and the type and capacity of network links between regions and sites. A network region may be a network hub or a network backbone. A network site is a geographical location that is connected to a network hub or backbone through a WAN link that may be either bandwidth constrained or not bandwidth constrained. The network configuration settings may be utilized to identify bypass zones for the network. Bypass zones are zones within a network that can be utilized to determine if media can bypass a mediation server.

According to another aspect, the bypass zones for a network are identified in an automated fashion by generating bypass identifiers using the network configuration settings. Bypass identifiers uniquely identify portions of a network that are connected by non-bandwidth constrained links. In one implementation, each network region identified by the network configuration settings is assigned a unique bypass identifier. Each site identified by the network configuration settings is assigned the same bypass identifier as the site's parent region if the site is not connected to the region by a bandwidth constrained network link. If a site is connected to a parent region by a bandwidth constrained network link, then the site is assigned a unique bypass identifier. Each subnet identified by the network configuration settings is assigned the same bypass identifier as its parent site.

During call setup, the bypass identifiers may be utilized to determine if media, such as audio or video data, for a call can bypass a mediation server. In particular, during call setup the bypass identifier assigned to an endpoint for the call is identified. The bypass identifier assigned to a gateway for the call is also identified. A determination is then made as to whether the bypass identifier assigned to the gateway is the same as the bypass identifier assigned to the endpoint. If the bypass identifiers are the same, then a mediation server may be bypassed for the call. If the bypass identifiers are not the same, then the mediation server remains in the media path for the call. The mediation server may perform this process for calls outgoing from a data network. A network endpoint may perform this process for calls incoming to a data network.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1A:
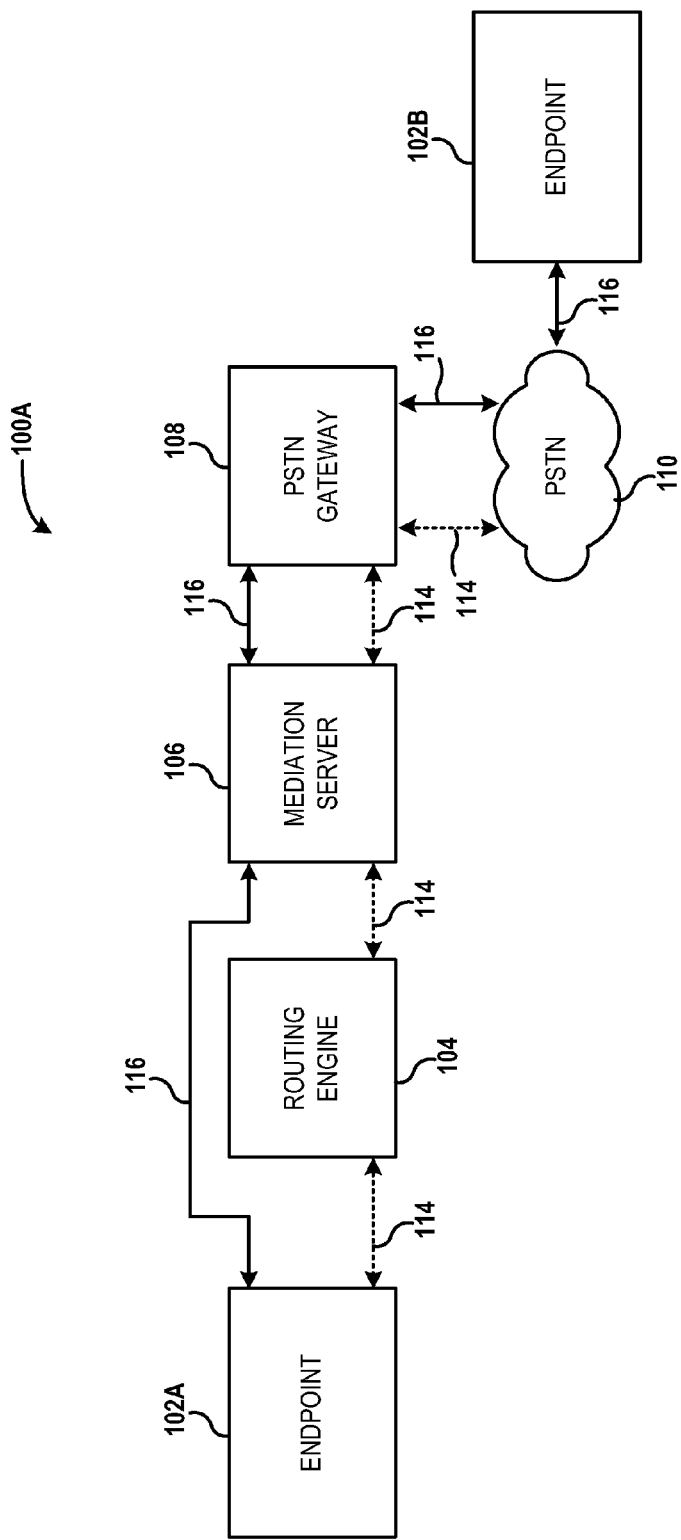
FIG. 1A is a network diagram showing an illustrative operating environment for the embodiments presented herein.

The following detailed description is directed to technologies for determination of bypass zones from network configuration settings. As discussed briefly above, bypass zones for a network may be identified by generating bypass identifiers from network configuration settings. During call setup the bypass identifier assigned to an endpoint for the call is identified and the bypass identifier assigned to a gateway for the call is identified. A determination is then made as to whether the bypass identifier assigned to the gateway is the same as the bypass identifier assigned to the endpoint. If the bypass identifiers are the same, then a mediation server may be bypassed for the call. As discussed briefly above, bypassing the mediation server causes the mediation server to be removed from the media path. If the bypass identifiers are not the same, then the mediation server remains in the media path for the call.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of various technologies for determination of bypass zones from network configuration settings will be described.

Turning now to FIG. 1A, details will be provided regarding one embodiment presented herein for determination of bypass zones from network configuration settings. In particular, FIG. 1A is a network diagram showing a network 100A that provides an illustrative operating environment for the embodiments presented herein. The network 100A shown in FIG. 1A is a real-time communications network that allows voice and data calls to be placed over a data network. For instance, the network 100A might provide functionality for VoIP calls to be made between endpoints connected by one or more network links. The network 100A shown in FIG. 1A also allows calls to be placed and received by endpoints in the data network from other endpoints connected to a legacy network, such as a PSTN.

In one implementation the endpoint 102A is an endpoint on a data network, such as a laptop or desktop computer or a VoIP telephone, and the endpoint 102B is a legacy telephone connected to the PSTN 110. Calls, which may also be referred to herein as "sessions", may be placed from the endpoint 102A to the endpoint 102B or from the endpoint 102B to the endpoint 102A. It should be appreciated that the term "endpoint" as utilized herein refers to any device that can terminate a call on a data or legacy telecommunications network.

In order to enable the functionality described above, a number of network components may be utilized. For instance, in one implementation a routing engine 104, a mediation server 106, and a PSTN gateway 108 are utilized. The routing engine 104 provides, among other things, functionality for identifying the particular mediation server 106 that should be utilized during a session. The mediation server 106 is utilized to mediate signaling and to transcode media to and from other types of networks, such as the PSTN 110 or a cellular network. For instance, the mediation server 106 may interface with the PSTN gateway 108 to provide PBX interoperability. The mediation server 106 may also provide signaling and media translation functionality to allow calls to be placed on and received from the PSTN 110.

As shown in FIG. 1A, a signaling path 114 may be established between the various components that is separate from a media path 116. The signaling path 114 refers to a network path utilized to provide signaling instructions between the various components shown in FIG. 1A. The media path 116 represents the path that the actual media for a session, such as audio data or video data, takes between the endpoints 102A and 102B.

Figure 1B:
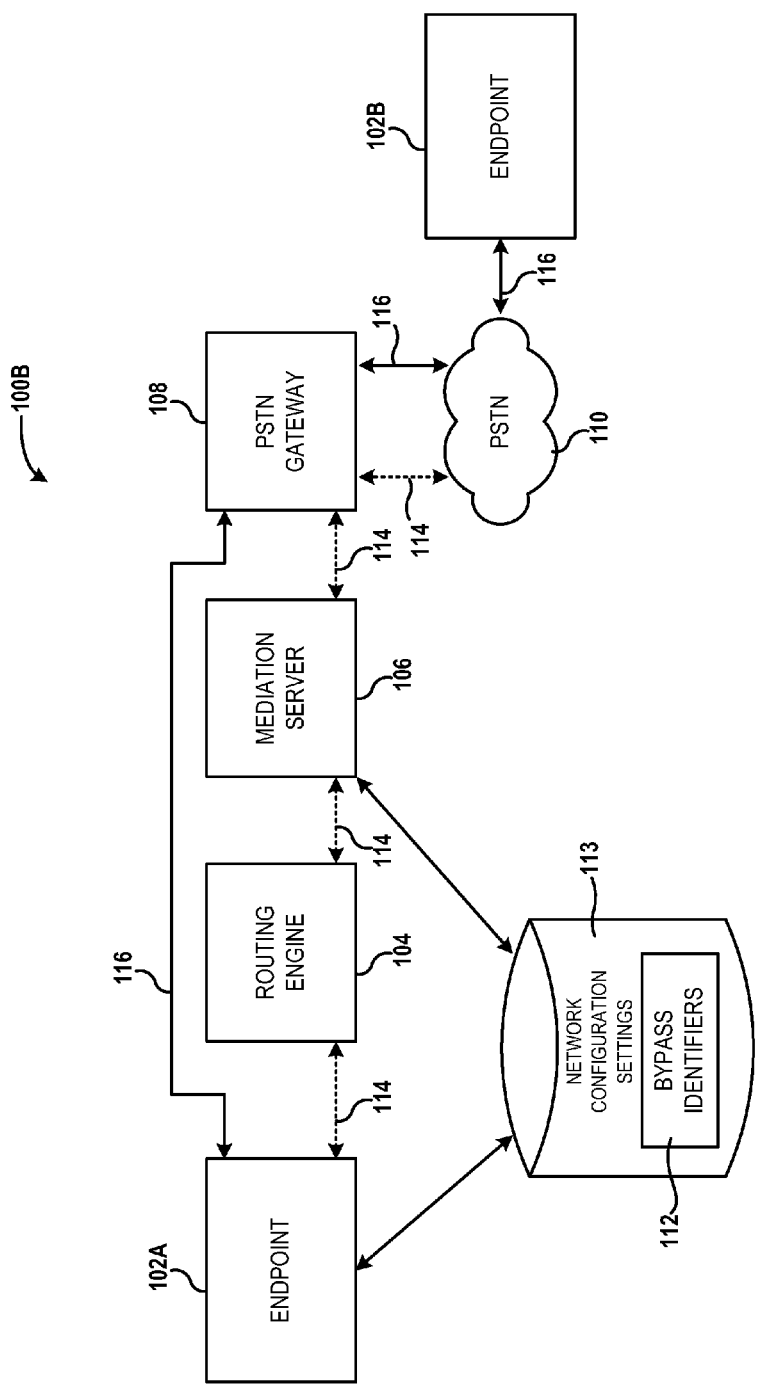
FIG. 1B is a network diagram showing aspects of one embodiment disclosed herein for determining bypass zones from network configuration settings.

As discussed briefly above, the media path 116 typically passes through the mediation server 106. The mediation server 106 may transcode the media or perform other operations on the media. However, as also discussed briefly above, the mediation server 106 may add latency and increase the probability of packet loss. As a result, some real-time communications installations utilize a media bypass feature wherein the media path 116 bypasses the mediation server 106. This is illustrated in FIG. 1B. By removing the mediation server 106 from the media path 116, the latency added by the mediation server can be avoided and packet loss can be reduced. It can be difficult, however, to determine when it is appropriate for the media path 116 to bypass the mediation server 106.

Utilizing the technologies and concepts presented herein, bypass zones can be determined in an automated fashion based upon the topology of a network. The bypass zones can then be utilized during call setup to determine if the mediation server 106 can be bypassed for a call. According to one implementation, the bypass zones can be determined in an automated fashion by a computing system based upon the topology of a network as defined by network configuration settings. Additional details regarding this process will be provided below.

A network 100B is illustrated in FIG. 1B that implements the various concepts and technologies provided herein for determining bypass zones from network configuration settings. In the network 100B, network configuration settings 113 are stored in a database. The network configuration settings 113 define the topology of the network 100B. For instance, the network configuration settings 113 might identify network regions, sites associated with the network regions, subnets of the sites, and the type and capacity of the network links between regions and sites. The network configuration settings 113 may be specified by an administrator of the network 100B or generated in another fashion. As will be described in greater detail below, the network configuration settings 113 may be utilized to identify bypass zones for the network 100B. Bypass zones are zones within the network 100B that can be utilized to determine if the media path 116 can bypass the mediation server 106 for a session.

According to one implementation, the bypass zones for the network 100B are identified in an automated fashion by generating bypass identifiers 112 using the network configuration settings 113. Bypass identifiers 112 identify the portions of the network 100B that are connected by non-bandwidth constrained network links. The bypass identifiers may be stored with the network configuration settings 113 in a database or other type of data store that is accessible to an endpoint 102A on the data network and the mediation server 106.

A network component within the network 100B may be configured to generate the bypass identifiers 112. For instance, in one implementation, a bandwidth policy service generates the bypass identifiers 112 based on the network configuration settings 113 and stores the bypass identifiers 112. It should be appreciated that, in other embodiments, other network components or computing systems may generate the bypass identifiers 112. Additional details regarding the process of generating the bypass identifiers 112 will be provided below with respect to FIG. 2. Details regarding the use of the bypass identifiers 112 to determine whether a media path 116 can bypass a mediation server 106 will be provided below with respect to FIGS. 3-6.

Figure 2:
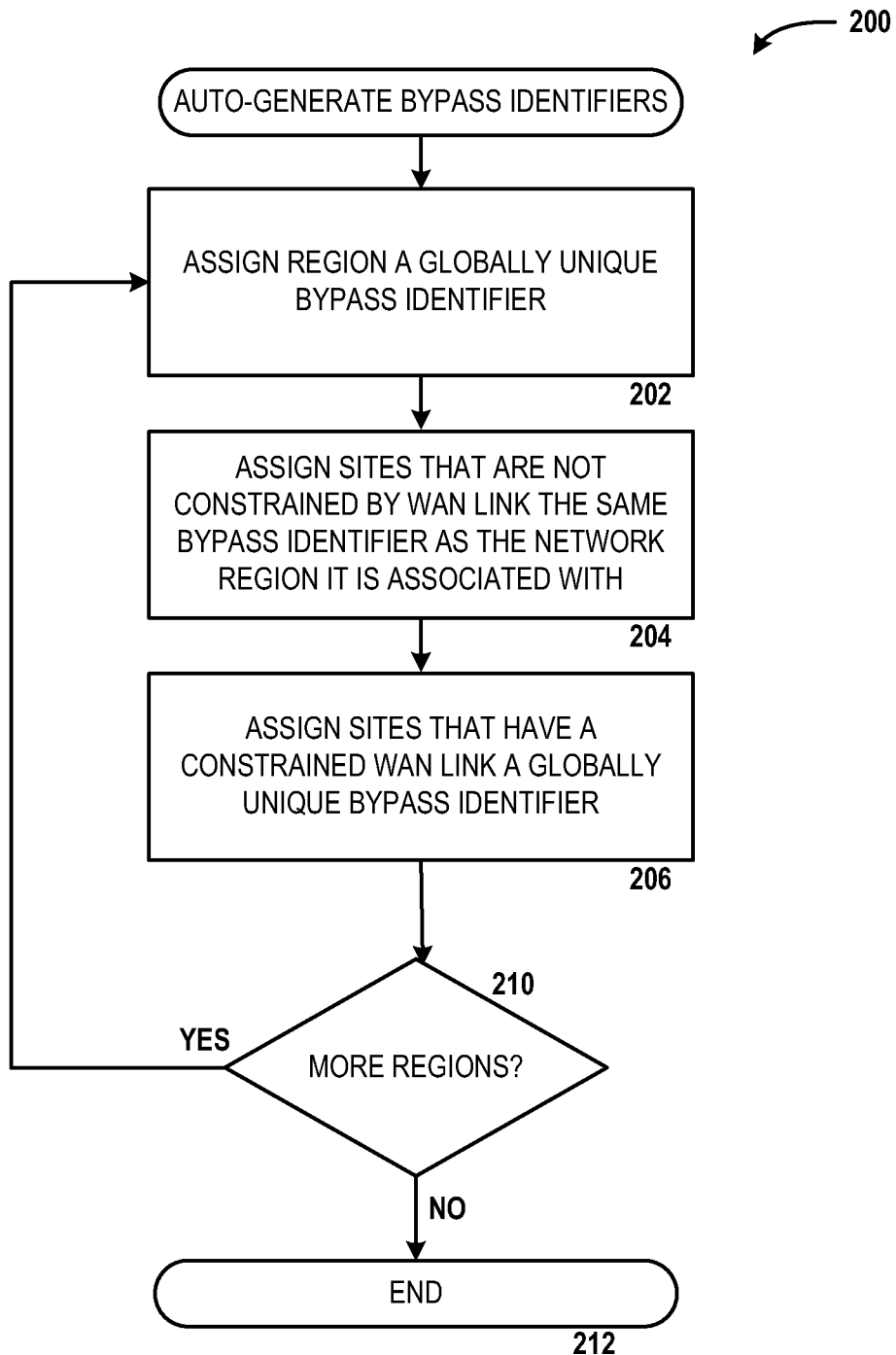
FIG. 2 is a flow diagram showing an illustrative routine for generating bypass identifiers according to one embodiment disclosed herein.

Turning now to FIG. 2, additional details will be provided regarding the embodiments presented herein for determination of bypass zones from network configuration settings. In particular, FIG. 2 shows a routine 200 that illustrates one illustrative process for generating the bypass identifiers 112 in one embodiment disclosed herein.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 200 begins at operation 202, where each region in a network is assigned a globally unique bypass identifier 112. As utilized herein the term "region" refers to either a network hub or a network backbone. Additionally, as utilized herein, the term "globally unique" refers to bypass identifiers 112 that are unique within a given network.

From operation 202, the routine 200 proceeds to operation 204 where sites within each region that are not connected to the region by a bandwidth constrained network link are assigned the same bypass identifier 112 as the associated region. It should be appreciated that a site within a network region may represent a branch location, a set of buildings, a campus, or another network site where endpoints, such as the endpoint 102A, are located.

From operation 204, the routine 200 proceeds to operation 206 where sites within each network region that are connected by a bandwidth constrained link are assigned a globally unique bypass identifier 112. In this manner, it should be appreciated that each site's bypass identifier 112 will be that of the associated network region if there is no bandwidth constraint between the site and the associated network region. If there is a bandwidth constraint between the site and the network region the site will be assigned a globally unique bypass identifier 112. It should be appreciated that each subnet of a site is also assigned the same bypass identifier 112 as the site that it is associated with. In this manner, each subnet inherits the bypass identifier 112 of its parent site.

From operation 206, the routine 200 proceeds to operation 210 where a determination is made as to whether additional network regions remain to be assigned a bypass identifier 112. If so, the routine 200 proceeds to operation 202 described above where the network region, and the sites and subnets within the network region, are assigned bypass identifiers 112. If no additional regions remain to be assigned bypass identifiers 112, the routine 200 proceeds from operation 210 to operation 212.

Figure 3:
FIG. 3 is a data structure diagram showing a data structure utilized to store bypass identifiers in one embodiment disclosed herein.
Figure 4:
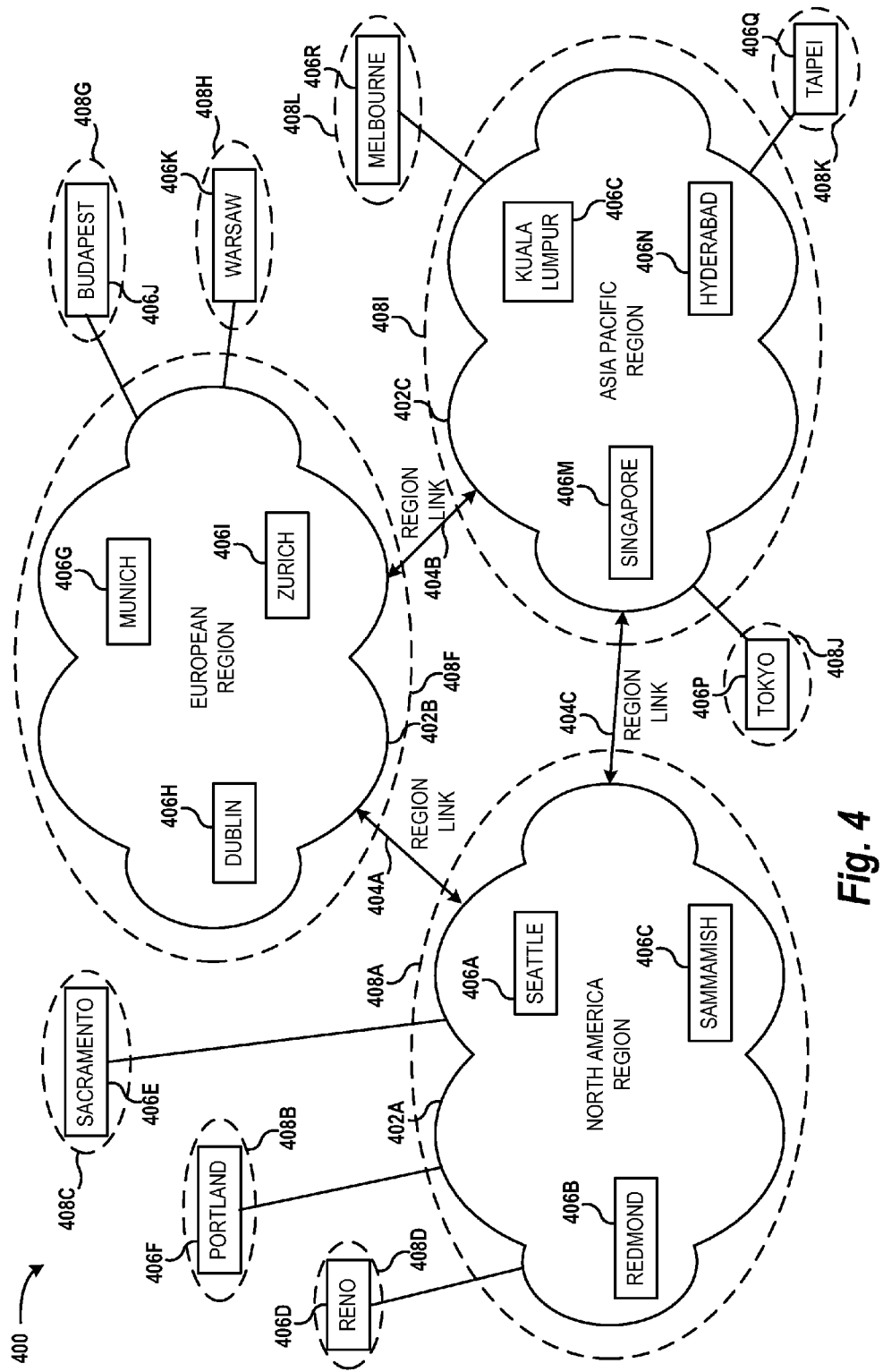
FIG. 4 is a network diagram showing aspects of the assignment of bypass identifiers to regions, sites, and subnets in an illustrative network environment.

Referring now to FIGS. 3 and 4, an illustrative data structure 300 will be described for storing bypass identifiers 112 for an illustrative network 400. As shown in FIG. 3, the data structure 300 includes the fields 302A-302D in one embodiment presented herein. The field 302A is utilized to identify a particular network region, the field 302B is utilized to identify a network site within a network region, and the field 302C is utilized to identify subnets within a particular network site. The field 302D is utilized to store a bypass identifier 112 for a specified network region, network site, or subnet. The data shown in the fields 302A-302D for the illustrative data structure 300 shown in FIG. 3 corresponds to the network 400 illustrated in FIG. 4. It should be appreciated that the data structure shown in FIG. 3 is illustrative and that other types of data structures might be utilized.

As shown in FIG. 4, the network 400 includes the regions 402A-402C. The region 402A corresponds to North America, the region 402B corresponds to Europe, and the region 402C corresponds to Asia Pacific. The region 402A is connected to the region 402B by way of a link 404A, the region 402B is connected to the region 402C by way of a link 404B, and the region 402C is connected to the region 402A by way of the link 404C. In the illustrative bypass data structure 300 shown in FIG. 3, the regions 402A-402C have each been assigned unique bypass identifiers 112. The bypass identifier 112 for the region 402A is one, the bypass identifier 112 for the region 402B is five, and the bypass identifier 112 for the region 402C is eight.

In the network 400 illustrated in FIG. 4, the region 402A includes three sites 406A-406C that are not connected to the region 402A by bandwidth constrained network links. The region 402A also includes three sites 406D-406F that are connected to the region 402A by bandwidth constrained links. Accordingly, in view of the process discussed above with reference to FIG. 2, the sites 406A-406C have been assigned the same bypass identifier 112 as the region 402A. The sites 406D-406F have each been assigned unique bypass identifiers 112.

The network region 402B includes three sites 406G-406I that are not connected to the region 402B by way of a bandwidth constrained network link. The region 402B is also associated with two sites 406J-406K that are connected to the region 402B by way of bandwidth-constrained link. Accordingly, in view of the process discussed above with reference to FIG. 2, the sites 406G-406I have been assigned the same bypass identifier 112 as the region 402B and the sites 406J-406K have each been assigned unique bypass identifiers 112.

The region 402C includes three sites 406L-406N that are not connected to the region 402C by way of bandwidth constrained network links. Accordingly, these sites have been assigned the same bypass identifier 112 as the region 402C. The region 402C is also associated with three sites 406P-406R that are connected to the region 402C by way of bandwidth constrained network links. Accordingly, the sites 406P-406R have been assigned unique bypass identifiers 112.

In view of the above, it should be appreciated that bypass zones 408A-408L have been assigned to the regions, sites, and subnets illustrated in FIG. 4. The bypass zone 408A includes the region 402A and the sites 406A-406C. The bypass zone 408B includes the site 406F. The bypass zone 408C includes the site 406E. The bypass zone 408D includes the site 406D. The bypass zone 408F includes the region 402B and the sites 406G-406I. The bypass zone 408G includes the site 406J. The bypass zone 408H includes the site 406K. The bypass zone 408I includes the region 402C and the sites 406L-406N. The bypass zone 408J includes the site 406P. The bypass zone 408K includes the site 406Q. The bypass zone 408L includes the site 406R. Details will be provided below regarding the use of the bypass identifiers 112 to determine whether a mediation server 106 can be bypassed for a particular call.

Figure 5:
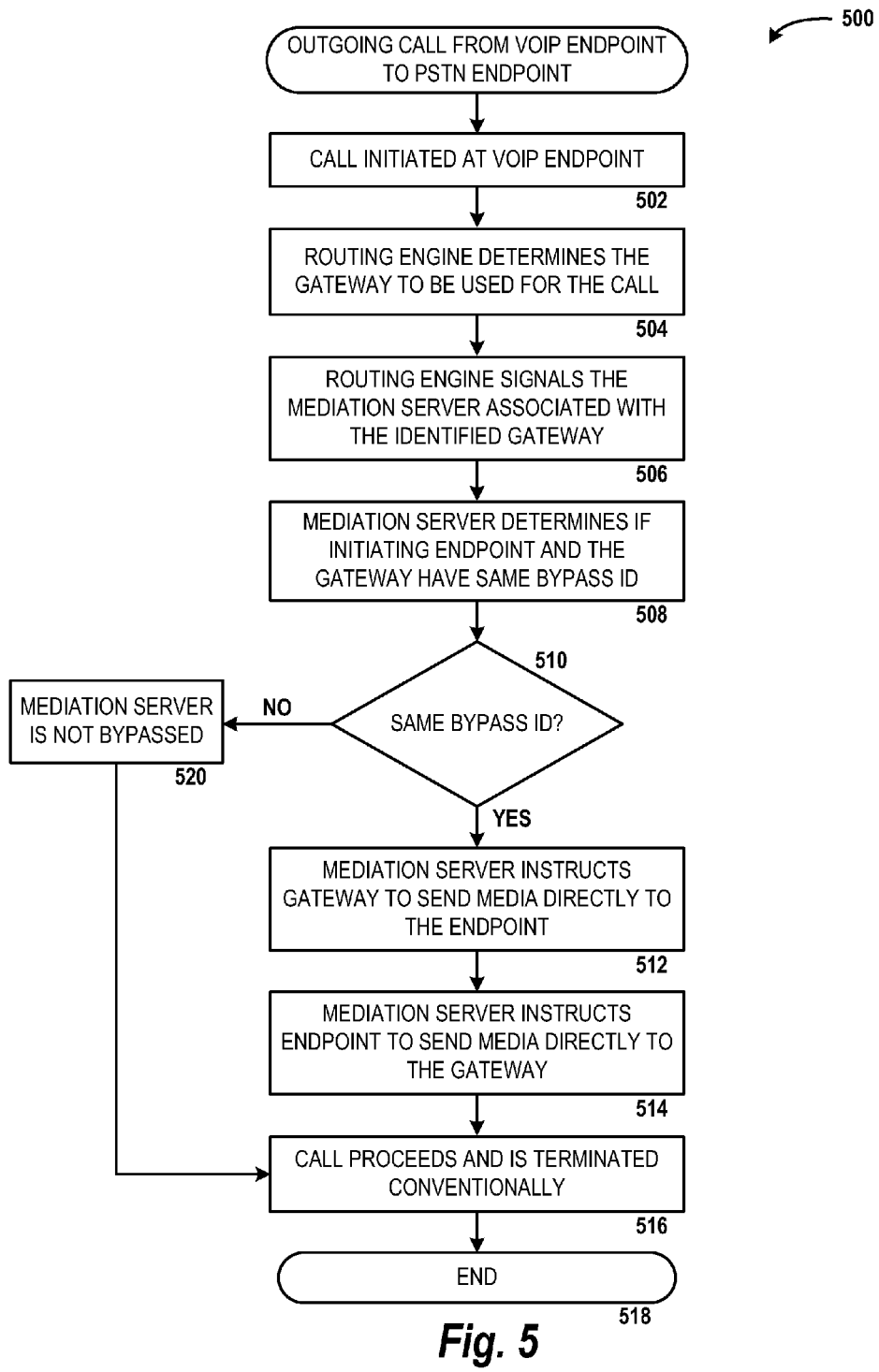
FIG. 5 is a flow diagram showing an illustrative routine for bypassing a mediation server utilizing bypass zones for an outgoing call from a data network.

Referring now to FIG. 5, an illustrative routine 500 will be described illustrating operations performed utilizing the bypass zones 408 to determine whether the mediation server 106 may be bypassed during an outgoing call from an endpoint 102A in the data communications network to an endpoint 102B in the PSTN 110. The routine 500 begins at operation 502 where a call is initiated at the endpoint 102A. In response to the initiation of the call, the endpoint 102A signals the routing engine 104. In turn, the routing engine 104 identifies the gateway 108 to be utilized for the call. Once the gateway 108 has been identified, the routing engine 104 signals the mediation server 106 associated with the identified gateway 108.

In response to receiving the signal from the routing engine 104, the mediation server 106 determines if the initiating endpoint 102A and the gateway 108 have the same bypass identifier 112. In this regard, the mediation server 106 may retrieve the bypass identifier 112 for the site or subnet containing the endpoint 102A. The mediation server 106A might also retrieve the bypass identifier 112 for the site or subnet containing the gateway 108.

Once the bypass identifiers 112 for the endpoint 102A and the PSTN gateway 108 have been retrieved, the routine 500 proceeds to operation 510 where the mediation server 106 determines whether the endpoint 102A and the gateway 108 have the same bypass identifier 112. If the endpoint 102A and the gateway 108 do not have the same bypass identifier 112, the routine 500 proceeds from operation 510 to operation 520 where the mediation server 106 is not bypassed. If the mediation server 106 is not bypassed, the media flows between the endpoint and the gateway 108 through the mediation server 106. From operation 520, the routine 500 proceeds to operation 516 where the call proceeds and is terminated in a conventional fashion. The routine 500 proceeds from operation 516 to operation 518, where it ends.

If, at operation 510, the mediation server 106 determines that the endpoint 102A and the gateway 108 have the same bypass identifier 112, the routine 500 proceeds from operation 510 to operation 512. At operation 512, the mediation server 106 instructs the gateway 108 to transmit media directly to the endpoint 102A on the media path 116 shown in FIG. 1B. The routine 500 then proceeds to operation 514 where the mediation server 106 instructs the endpoint 102 to send media directly to the gateway 108, thereby bypassing the mediation server 106. The routine 500 then proceeds to operation 516 where the call proceeds and is terminated conventionally.

It should be appreciated that in one embodiment, the mediation server 106 determines whether the media path 116 may bypass the mediation server 106 for calls initiating from an endpoint 102A in the data communications network. As will be described below with reference to FIG. 6, the endpoint 102A may make this determination for calls initiating from the PSTN 110. Other network components may make this determination in other embodiments.

Figure 6:
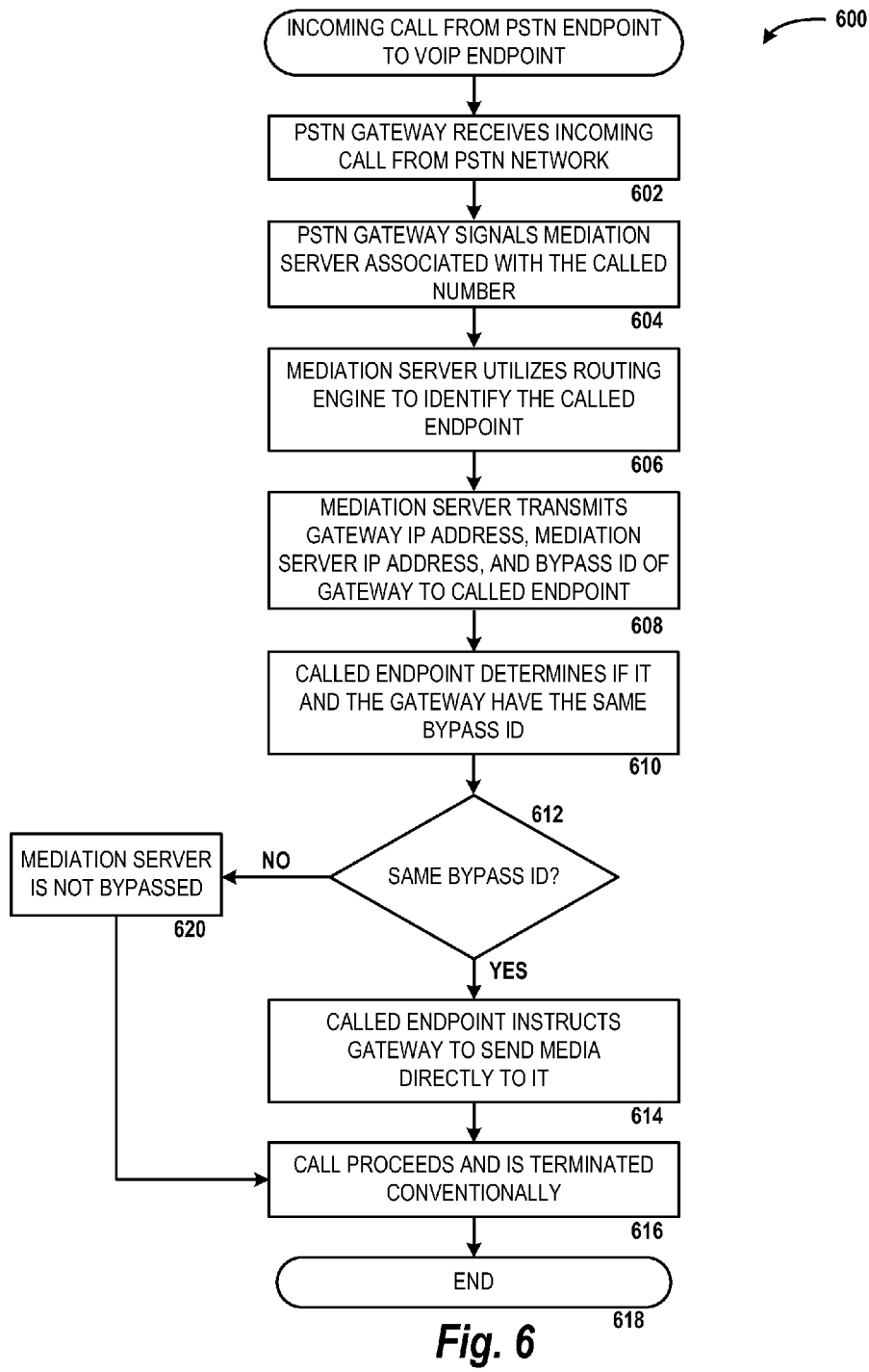
FIG. 6 is a flow diagram showing an illustrative routine for bypassing a mediation server utilizing bypass zones for a call incoming to a data network.

Turning now to FIG. 6, an illustrative routine 600 will be described illustrating operations performed to determine if the mediation server 106 may be bypassed for a call originating at an endpoint 102B in the PSTN 110. The routine 600 begins at operation 602 where the gateway 108 receives a call incoming from an endpoint 102B in the PSTN 110. The routine 600 then proceeds from operation 602 to operation 604 where the gateway 108 signals the mediation server 106 associated with the called number.

From operation 604, the routine 600 proceeds to operation 606 where the mediation server 106 utilizes the routing engine 104 to identify the called endpoint 102A. Once the called endpoint 102A has been identified, the mediation server 106 transmits a network address of the gateway 108, a network address of the mediation server 106, and the bypass identifier 112 of the gateway 108 to the endpoint 102A.

From operation 608, the routine 600 proceeds to operation 610 where the endpoint 102A determines whether it has the same bypass identifier 112 as the gateway 108. In this regard, the endpoint 102A may retrieve its own bypass identifier 112. As discussed above, the endpoint 102A may compare its bypass identifier 112 to the bypass identifier 112 of the gateway 108 received from the mediation server 106 to make this determination.

From operation 610, the routine 600 proceeds to operation 612 where the endpoint 102A determines whether it has the same bypass identifier 112 as the gateway 108. If not, the routine 600 proceeds from operation 612 to operation 620 where the mediation server 106 is not bypassed. Because the mediation server 106 is not bypassed, the media flows between the endpoint and the gateway 108 through the mediation server 106. From operation 620, the routine 600 proceeds to operation 616 where the call proceeds and is terminated conventionally. From operation 616, the routine 600 proceeds to operation 618, where it ends.

If, at operation 612, the endpoint 102A determines that it has the same bypass identifier 112 as the gateway 108, the routine 600 proceeds to operation 614. At operation 614, the called endpoint 102A instructs the gateway 108 to sends media directly to the endpoint 102A via the media path 116 shown in FIG. 1B. The endpoint 102A also sends media directly to the PSTN gateway 108, thereby bypassing the mediation server 106. From operation 614, the routine 600 proceeds to operation 616 where the call proceeds and is terminated conventionally. The routine 600 ends at operation 618.

Figure 7:
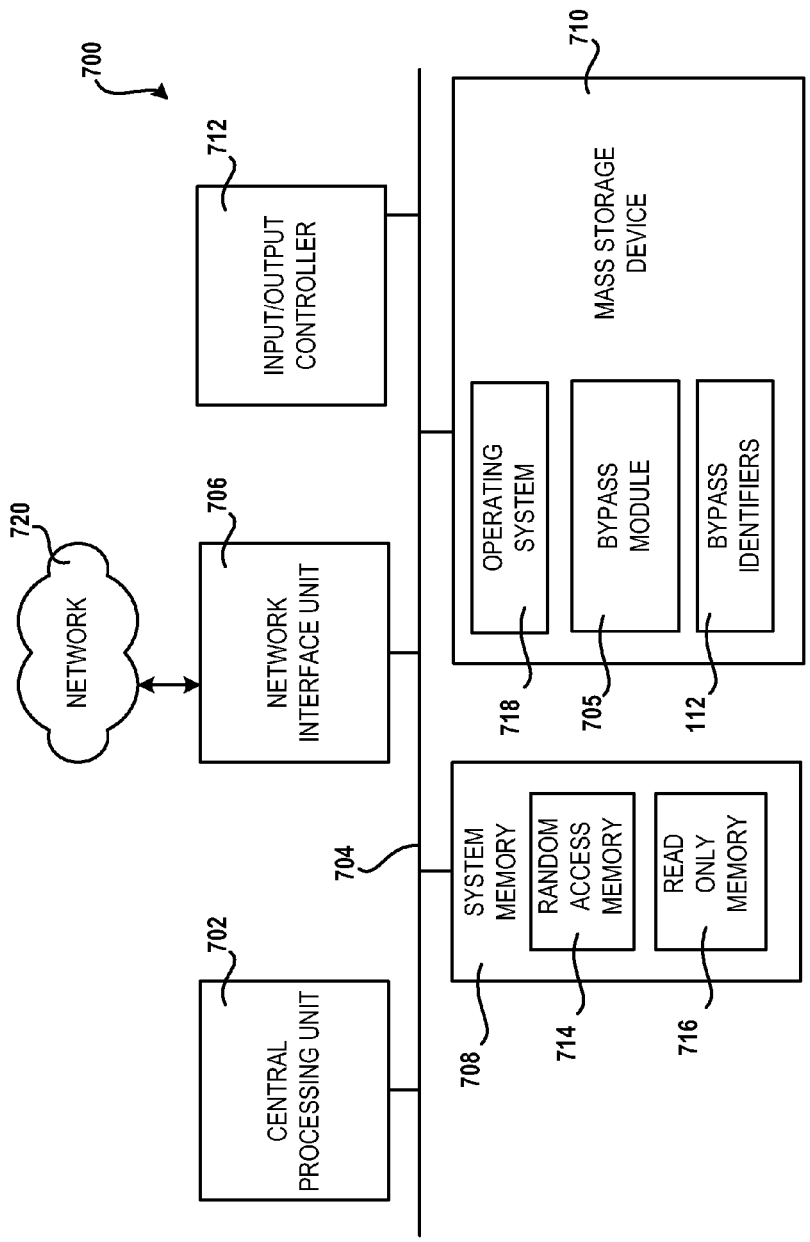
FIG. 7 is a computer architecture diagram showing an illustrative computer hardware and software architecture for a computing system capable of implementing the embodiments presented herein.

FIG. 7 shows an illustrative computer architecture for a computer 700 capable of executing the software components described herein for determining bypass zones from network configuration settings. The computer architecture shown in FIG. 7 illustrates a conventional computing system and may be utilized to execute any of the various software components described herein or to store the databases described herein.

The computer architecture shown in FIG. 7 includes a central processing unit 702 ("CPU"), a system memory 708, including a random access memory 714 ("RAM") and a read-only memory ("ROM") 716, and a system bus 704 that couples the memory to the CPU 702. A basic input/output system ("BIOS") containing the basic routines that help to transfer information between elements within the computer 700, such as during startup, is stored in the ROM 716. The computer 700 further includes a mass storage device 710 for storing an operating system 718, application programs, and other program modules, which will be described in greater detail below.

The mass storage device 710 is connected to the CPU 702 through a mass storage controller (not shown) connected to the bus 704. The mass storage device 710 and its associated computer-readable media provide non-volatile storage for the computer 700. Although the description of computer-readable media contained herein refers to a mass storage device, such as a hard disk or CD-ROM drive, it should be appreciated by those skilled in the art that computer-readable storage media can be any available computer storage media that can be accessed by the computer 700.

By way of example, and not limitation, computer-readable storage media may include volatile and non-volatile, removable and non-removable media implemented in any method or technology for storage of information such as computer-readable instructions, data structures, program modules or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other non-transitory medium which can be used to store the desired information and which can be accessed by the computer 700.

According to various embodiments, the computer 700 may operate in a networked environment using logical connections to remote computers through a network such as the network 720. The computer 700 may connect to the network 720 through a network interface unit 706 connected to the bus 704. It should be appreciated that the network interface unit 706 may also be utilized to connect to other types of networks and remote computer systems. The computer 700 may also include an input/output controller 712 for receiving and processing input from a number of other devices, including a keyboard, mouse, or electronic stylus (not shown in FIG. 7). Similarly, an input/output controller may provide output to a display screen, a printer, or other type of output device (also not shown in FIG. 7).

As mentioned briefly above, a number of program modules and data files may be stored in the mass storage device 710 and RAM 714 of the computer 700, including an operating system 718 suitable for controlling the operation of a networked desktop, laptop, or server computer. The mass storage device 710 and RAM 714 may also store one or more program modules. In particular, the mass storage device 710 and the RAM 714 may store a bypass module 705 capable of implementing the functionality described above for causing media to bypass a mediation server 106. The mass storage device 710 and RAM 714 may also store other program modules and data, such as the data structures and databases described above.

In general, software applications or modules may, when loaded into the CPU 702 and executed, transform the CPU 702 and the overall computer 700 from a general-purpose computing system into a special-purpose computing system customized to perform the functionality presented herein. The CPU 702 may be constructed from any number of transistors or other discrete circuit elements, which may individually or collectively assume any number of states. More specifically, the CPU 702 may operate as one or more finite-state machines, in response to executable instructions contained within the software or modules. These computer-executable instructions may transform the CPU 702 by specifying how the CPU 702 transitions between states, thereby physically transforming the transistors or other discrete hardware elements constituting the CPU 702.

Encoding the software or modules onto a mass storage device may also transform the physical structure of the mass storage device or associated computer readable storage media. The specific transformation of physical structure may depend on various factors, in different implementations of this description. Examples of such factors may include, but are not limited to: the technology used to implement the computer readable storage media, whether the computer readable storage media are characterized as primary or secondary storage, and the like. For example, if the computer readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for identifying bypass zones based upon network configuration settings have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for bypassing a mediation server in a communication path between at least two communication endpoints for a call between the at least two communication endpoints, the method comprising performing computer-implemented operations for:
    assigning, by a computing device, a unique bypass identifier to each network region identified by network configuration settings, each network region comprising a plurality of sites;
    assigning, by the computing device, sites within each network region that are not connected to the network region by way of a bandwidth constrained network link a same bypass identifier as the network region, and sites within each network region that are connected to the network region by way of the bandwidth constrained network link the unique bypass identifier;
    identifying, by the computing device, a bypass identifier for a gateway for the call containing media;
    identifying, by the computing device, a bypass identifier for a network endpoint for the call;
    determining, by the computing device, if the bypass identifier for the gateway is the same as the bypass identifier for the network endpoint; and
    causing, by the computing device, the media to bypass the mediation server if the bypass identifier for the gateway is the same as the bypass identifier for the network endpoint.

2. The computer-implemented method of claim 1, further comprising:
assigning, by the computing device, each subnet of a site the same bypass identifier as the site.

3. The computer-implemented method of claim 1, further comprising causing, by the computing device, the media to flow through the mediation server if the bypass identifier for the gateway is not the same as the bypass identifier for the network endpoint.

4. The computer-implemented method of claim 1, wherein the operations for determining during the setup of the call whether media for the call can bypass the mediation server are performed by the mediation server.

5. The computer-implemented method of claim 1, wherein the operations for determining during the setup of the call whether media for the call can bypass the mediation server are performed by the network endpoint.

6. An apparatus comprising:
a processor; and
a memory connected to the processor having computer-executable instructions stored therein which, when executed by the processor, cause the apparatus to
assign a unique bypass identifier to each network region of a network identified by network configuration settings,
assign sites within each network region that are not connected to the network region by way of a bandwidth constrained network link a same bypass identifier as the network region, and assign sites within each network region that are connected to the network region by way of the bandwidth constrained network link a unique bypass identifier,
identify a bypass identifier for a gateway for a call containing media,
identify a bypass identifier for a network endpoint for the call,
determine if the bypass identifier for the gateway is the same as the bypass identifier for the network endpoint, and
cause the media to bypass the mediation server if the bypass identifier for the gateway is the same as the bypass identifier for the network endpoint.

7. The apparatus of claim 6, wherein the memory has further computer-executable instructions stored therein which, when executed by the processor, cause the processor to assign each subnet of a site the same bypass identifier as the site.

8. The apparatus of claim 6, wherein the memory has further computer-executable instructions stored therein which, when executed by the processor, cause the processor to cause the media to flow through the mediation server if the bypass identifier for the gateway is not the same as the bypass identifier for the network endpoint.

9. The apparatus of claim 6, wherein the operation of determining if the bypass identifier for the gateway is the same as the bypass identifier for the network endpoint is performed by the mediation server when the call is outgoing from the network and is performed by the network endpoint when the call is incoming to the network.

10. One of an optical storage disc, a magnetic storage device or a solid state storage device having computer-executable instructions stored thereon which, when executed by a computer, cause the computer to:
assign a unique bypass identifier to each region in a network;
assign a same bypass identifier of an associated region to each site that is not connected to the associated region by way of a bandwidth constrained network link;
assign the corresponding unique bypass identifier or the corresponding same bypass identifier of each site in the network to subnets of each site;
identify a bypass identifier assigned to a gateway for a call containing media;
identify a bypass identifier assigned to a network endpoint for the call;
determine if the bypass identifier assigned to the gateway is the same as the bypass identifier assigned to the network endpoint; and
cause the media for the call to bypass a mediation server if the bypass identifier assigned to the gateway is the same as the bypass identifier assigned to the network endpoint.

* * * * *